United States Patent [19]
Fox

[11] 3,872,717
[45] Mar. 25, 1975

[54] SOIL TESTING METHOD AND APPARATUS

[76] Inventor: Nathaniel S. Fox, 3820 Foxhill Drive, S.E., Marietta, Ga. 30060

[22] Filed: Jan. 3, 1972

[21] Appl. No.: 214,730

[52] U.S. Cl. ................................................. 73/84
[51] Int. Cl. ........................................... G01n 33/24
[58] Field of Search ............ 73/84, 88 E, 81, 425.2; 175/50, 58

[56] References Cited
UNITED STATES PATENTS

| | | | |
|---|---|---|---|
| 2,544,728 | 3/1951 | Safford | 73/425.2 X |
| 2,833,144 | 5/1958 | Miller et al. | 73/84 |
| 3,499,320 | 3/1970 | Fox et al. | 73/84 X |
| 3,576,220 | 4/1971 | Gill | 175/58 |

*Primary Examiner*—Jerry W. Myracle
*Attorney, Agent, or Firm*—Newton, Hopkins & Ormsby

[57] ABSTRACT

A method and apparatus for use in determining the soil characteristics of an area by conducting a number of on-the-site soil penetration measurements. The soil testing apparatus includes a portable control console operatively connected to a soil testing instrument which is adapted to be lowered to predetermined depths within a test bore hole. The soil testing instrument includes a cylindrical body member having power operable stablizing means adapted to be moved into contact with the walls of a test bore hole for stabilizing the testing instrument in position at a predetermined depth and for applying a surcharge pressure on the walls of the hole adjacent to the area to be penetrated. The soil testing instrument includes power operable penetration means for effecting controlled penetration of the soil walls of the test bore hole. The remote console includes control means for effecting operation of the stabilizer means and for effecting operation of the penetration element. A modified form of the soil testing instrument includes one or more soil sampler means which are power operable and are controlled from the remote console unit wherein the soil sampler means is operable for removing a soil sample from the wall of a test bore hole at predetermined depths.

7 Claims, 21 Drawing Figures

FIG 1　FIG 2　FIG 3　FIG 4　FIG 5　FIG 6　FIG 7

INVENTOR:
NATHANIEL S. FOX
BY:
Newton, Hopkins, & Ormsby
ATTORNEYS

SOIL TESTING METHOD AND APPARATUS

BACKGROUND OF THE INVENTION

This invention relates generally to a portable console unit operable for controlling a soil testing instrument which can be lowered into a test bore hole for conducting a number of on-the-site soil penetration tests and/or soil sampling operations.

In the construction industry, both in building construction and in highway and airfield constructions, the soil characteristics of the area in which a construction job is being performed must be obtained for utilization in designing the foundation for a building and for designing the required amount of soil treatment operations that are necessary for highway and airfield construction.

In the past, the soil engineer has determined the characteristics of the soil in a construction area by obtaining a number of soil samples from the area, transporting these soil samples to a laboratory and performing a number of soil measurement tests on the soil samples, in order to furnish the architect or design engineer the required soil data.

Two commonly used soil tests performed in a laboratory are the consolidation soil test and the California Bearing Ratio (CBR) soil test. Both of these tests are performed in a laboratory on soil samples taken from the area of construction.

In a consolidation test, the soil sample is placed in a device known as a consolidometer, where the sample is restricted from undergoing lateral displacement while a vertical load is applied to the sample, thus, maintaining one dimensional consolidation within the sample. Vertical deformation measurements of the consolidation sample with corresponding time and load increments are recorded and interpreted. The settlement of a proposed full scale structure resting on the soil is then predicted by extrapolation.

In a CBR test, a sample is taken to the laboratory, the sample is first soaked in water for a predetermined period of time, after which the sample is prestressed by applying a surcharge weight to the soil. After the soil has been prepared for testing, a penetration element having a predetermined area is pushed into the soil sample a predetermined distance, with pressure measurements taken on the penetration element. After a first penetration and pressure measurement is taken, the penetration element is pushed to a second distance and additional pressure measurements are recorded. After these measurements are obtained they are compared with a calibration chart and assigned a number. The CBR number can be compared with the CBR number 100 which is assigned to crushed limestone and utilized by the engineers in effecting their required designs.

The shortcomings of such laboratory testing are well known. The samples, while called "undisturbed" are really not, and the amount of disturbance and the effect thereof are difficult to evaluate. Sample recovery is often difficult and the laboratory testing of the samples is quite time consuming. Therefore, the soil tests performed on disturbed samples in the laboratory are not always reliable in predicting the characteristics of the soil condition. In addition, these tests are relatively expensive to perform.

A number of attempts have been made to provide on-the-site soil testing apparatus. One prior art soil testing apparatus is referred to as a penetrometer. A penetrometer test is performed by forming a bore hole to a predetermined depth, inserting a penetration element to the bottom of the bore hole, causing the penetration element to vertically penetrate a predetermined depth by applying weight forces to the penetration element and after initial penetration, causing the penetration element to further penetrate into the bottom of the bore hole a predetermined depth by applying additional weight forces and calculating the weight force required per unit of penetration. The above described on-the-site penetration test is undesirable since the weight forces applied to the penetration element are made by lifting and dropping a weight. If additional penetration measurements are needed at various depths, the penetration element must be removed, the bore hole extended, the penetration element reinserted and the manual weight applied penetration repeated. In addition to the amount of manual labor required, these tests are time consuming.

Still other types of on-the-site soil testing apparatus have been devised. However, these prior art soil testing apparatus are large in construction, requiring considerable effort in the transportation and location on the site. They are large for one or both of two reasons. Some of them force a penetrometer vertically into the soil, making in effect, its own hole. The other type merely pushes a penetrometer or piston vertically. In both cases a heavy weight must be available as a reaction to "jack against." Further, certain of these prior art soil testing apparatus are extremely expensive to manufacture and operate and are often unreliable in operation.

SUMMARY OF THE INVENTION

The above disadvantages of the prior art soil testing methods and apparatus have been overcome by the present invention which basically includes a portable console control unit having a testing implement which can be easily lowered by hand into a test bore hole, with the console control unit being operable for controlling the soil testing implement for making a number of penetration tests within a test bore hole and operable for taking soil samples from within the test bore hole.

One basic feature of the present invention is the provision of lightweight portable mechanism which can be easily transported and operated at the soil testing site by one individual.

Another important feature of the present invention allows the soil testing implement to make a number of soil tests in a test bore hole at a number of predetermined depths without having to remove the test implement from the test bore hole.

The soil testing implement utilized in the present invention includes a cylindrical body member adapted to be lowered into a test bore hole and includes power operable stabilizer means controlled from the console control unit. The stabilizer means are operable for contacting the walls of a test bore hole to lock the test implement into position at a predetermined depth. The stabilizer means are also operable for applying a predetermined surcharge pressure on the soil comprising the wall of the test bore hole surrounding the location which will be penetrated. The soil testing implement includes a penetration element which is power operable and controlled from the remote console unit. The remote console unit includes a pressure gauge means for measuring the amount of pressure placed on the stabilizer means and for measuring the amount of pressure placed on the penetration element, and includes electrical transducer measurement means for measuring the depth of penetration.

Another important feature of the present invention includes soil sampling means which are power operable and from the remote console for obtaining a soil sample in the area where penetration tests are conducted.

Another important feature includes the separable application of a predetermined measurable surcharge pressure on the soil wall adjacent to the area to be tested for penetration resistance.

Another important feature is the general geometry of the apparatus which allows for using the soil itself as a reaction to jack against rather than requiring dead weights for reactions.

Another important feature is the ability to apply dynamic forces to the penetration element and to the soil mass in its natural moisture and stress conditions.

It is therefore a primary object of the present invention to provide a lightweight portable soil testing apparatus which can effectively perform on-the-site soil measurements to be used in determining the soil condition in the area for construction.

Another object of the present invention includes the test implement which can be lowered to a number of predetermined depths within a preformed test bore hole, with the implement being capable of effecting a number of soil penetration measurements and for obtaining soil samples.

A further object of this invention is to provide on-the-site soil testing apparatus which is simple in construction, economical to manufacture and reliable in performance.

Still other objects and advantages of the details of construction will become apparent upon reading the following description of the illustrative embodiment embodying the principles of the present invention with reference to the attached drawings wherein like reference numerals have been used to refer to like parts throughout the several figures, and wherein:

DESCRIPTION OF THE ILLUSTRATIVE EMBODIMENTS

Figures 1, 3:
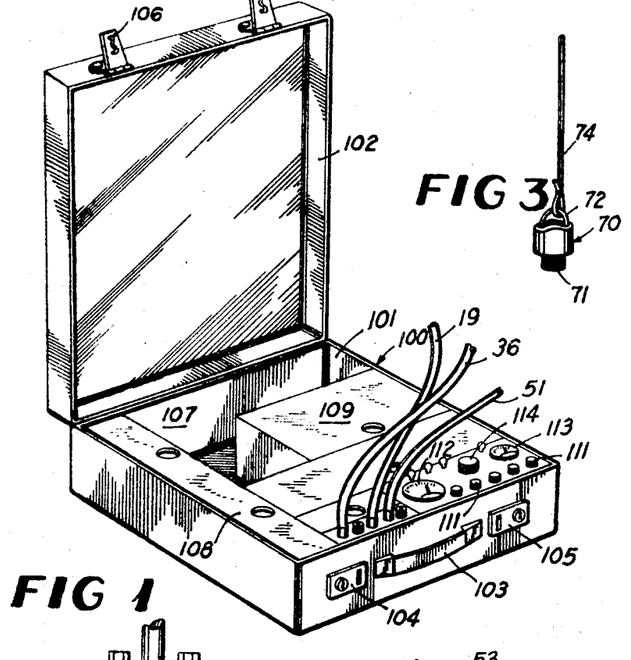
FIG. 1 is a perspecitve view of the console control unit embodying the principles of the present invention.
FIG. 3 is an enlarged fragmentary perspective view of an alternate method of lowering the soil testing implement into a test bore hole.

Referring now particularly to FIGS. 1–7 of the drawing, the soil testing method and apparatus embodying the principles of the present invention will be described with reference to a soil testing implement generally represented by the reference numeral 10; and shown in FIGS. 2–7 and a console control unit generally represented by the reference numberal 100 and shown in FIG. 1.

The function of the soil testing implement 10 is to provide mechanisms which can be lowered to predetermined depths within a preformed test bore hole and which is operable for effecting penetration of the soil wall structure and/or including means for removing samples from the area of penetration. The function of the remote control console 100 is to provide portable means which can be operatively connected to the test implement 10 and can be utilized for controlling the operation of the test implement and for taking and recording a number of soil testing measurements performed by the test implement 10.

Figure 2:
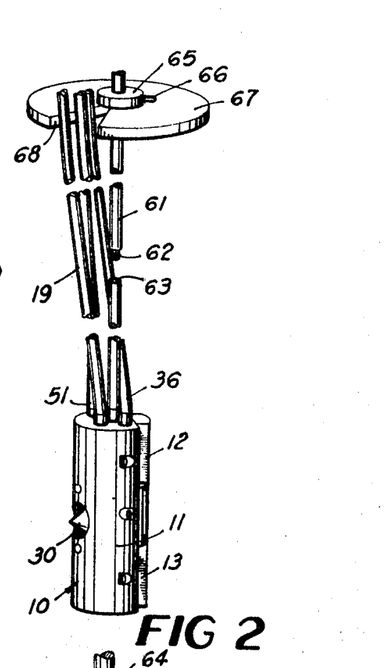
FIG. 2 is a perspective view of the soil testing implement embodying the principles of the present invention.

As shown in FIG. 2, the soil testing implement 10 is constructed as an elongated cylindrical body 11. The test implement 11 includes a pair of stabilizers 12, 13. Stabilizers 12, 13 are reciprocally supported by body 11 for movement from a retracted inoperable position to an extended stabilizing position. Each of the stabilizers 12, 13 include a stabilizer base element 14 which is connected to an elongated piston rod element 15. The piston rod element 15 is operatively connected to a piston 16 which is slidably supported within a cylindrical chamber 17 formed within body 11. The cylindrical chamber 17 includes a hydraulic input port 18 operative for introducing a supply of high pressure fluid into the cylinder chamber for expanding the piston to extend the base stabilizer 14 outwardly to the operable position. The hydraulic input port 18 is operatively connected to hydraulic control line 19. The hydraulic control line 19 is connected to the remote control console and includes conventional means for effecting operation of the stabilizers 12, 13, includes a compression spring 20 which surrounds the piston rods 15 and are located between the cylindrical end wall and piston 16 for returning the stabilizer to a retracted inoperable position. Each of the stabilizers 12, 13 are controlled simultaneously through an input supply into control line 19 for extending the stabilizers to an extended operable position. Stabilizers 12, 13 are operable for contacting the wall structure of a preformed test bore hole for locking the soil testing implement in position at a predetermined depth and for applying a predetermined surcharge pressure on the soil walls, as shown in FIGS. 9–12.

As shown in FIGS. 2 and 3, the soil testing implement 10 includes a conical shaped end portion 31 operatively connected to a piston rod element 32. Piston rod element is operatively connected to a piston 33. Piston 33 is reciprocally supported within a cylindrical chamber 34 formed within the implement body 11. Piston 33 is reciprocally operable for extending the penetration element 31 outwardly into a soil penetration condition by means of hydraulic fluid supplied through a hydraulic input port 35. Fluid is introduced into hydraulic input port 35 by a control supply line 36. Piston 33 is returned to a retracted inoperable position by means of a compression spring 37. Compression spring 37 srrounds the piston rod 32 and is located between the piston element 33 and an end wall of the cylindrical chamber 34. The input of hydraulic fluid into the piston chamber for effecting movement of the penetration element 31 to an extended soil penetrating position is controlled by the remote control unit 100, as will be described in more detail hereinbelow.

Figure 4:
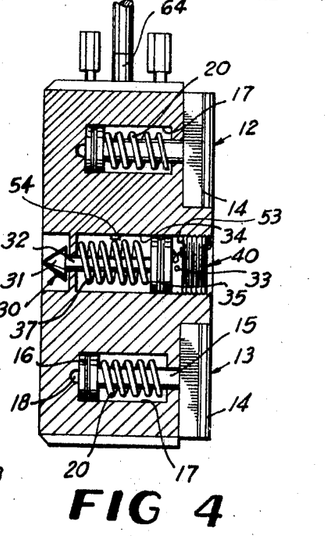
FIG. 4 is an enlarged vertical sectional view taken through the soil testing implement shown in FIG. 2.
Figures 5, 6, 7:
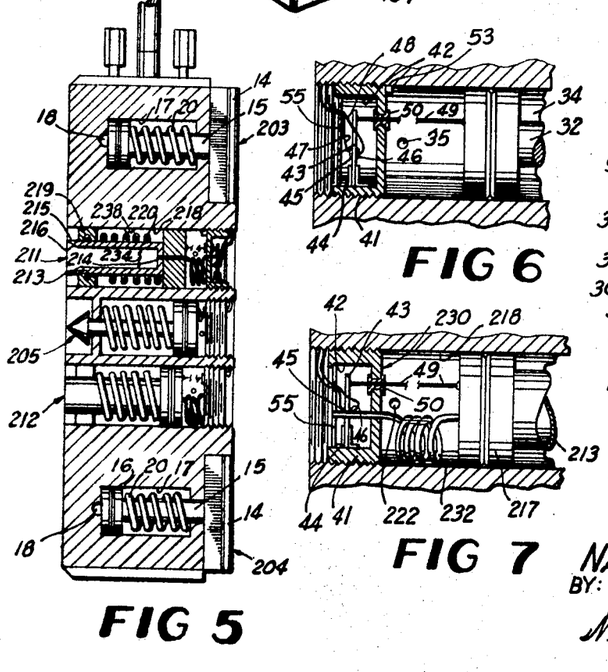
FIG. 5 is a vertical sectional view of a modified form of the soil testing implement.
FIG. 6 is an enlarged fragmentary vertical sectional view of an electrical transducer associated with the soil penetration element.
FIG. 7 is an enlarged vertical sectional view of the electrical transducer associated with the soil sample apparatus utilized in the soil testing implement of FIG. 5.

As shown in FIGS. 4 and 6, the soil penetration element 30 includes an electrical transducer means 40. The electrical transducer means 40 is constructed of a removable plug element 41 which is threadably mounted within cylindrical chamber 34. The removable plug 40 provides an end wall for containing the hydraulic fluid within the chamber 34 whereby the piston 33 can be moved to an expanded condition. The transducer plug element 41 includes a recessed housing portion 42. Supported within the recessed housing portion 42 is a cantilever beam 43. Cantilever beam 43 is secured in a fixed position relative to the plug 41 by conventional bracket support means 44. A pair of strain gauges 45, 46 are secured to opposite sides of the cantilever beam 43. Strain gauges 45, 46 are operatively connected through electrical input lines 47, 48, respectively, whereby electrical current conducted due to the bending of beam 43 can be transmitted through lead lines 47, 48 to voltage meter or strain gauge indicator supported on the remote control console. The cantilever beam 43 is connected by a flexible cable means 49 to the piston element 33, whereby movement of the piston 33 will effect a corresponding movement of cantilever beam 43. Conventional seal means 50 is provided in the plug surrounding the flexible cable 49. The electrical lead lines 47, 48 are connected through electrical control lines 51 to the remote control console 100 whereby the electrical current conducted through the transducer can be recorded for interpretation.

As shown in FIGS. 4 and 6, a pair of switch means 53, 54 are operatively associated with piston 33 and electrically connected to indicator lights on the control console for indicating the fully retracted and fully extended position of penetration element 30. A removable cover 55 is frictionally fitted within and adjacent the open end of housing 42 for protection of the strain gauges 45, 46.

Figures 8, 11:
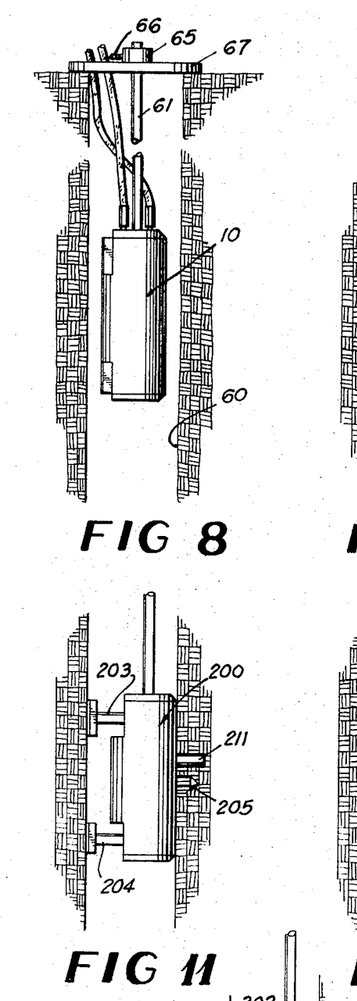
FIGS. 8–13 are schematic illustrations of a method of performing soil measurements within a test bore hole.
Figures 9, 12:
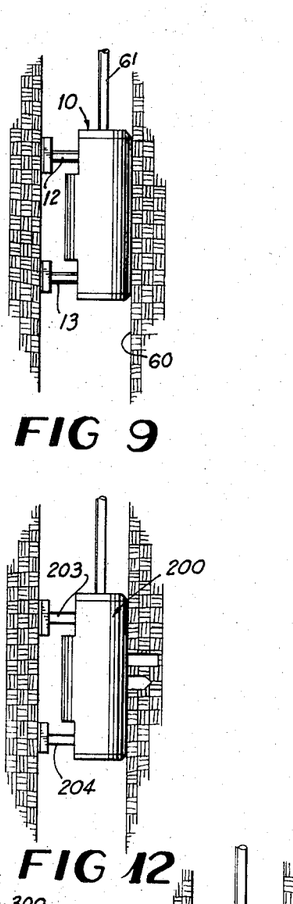

Referring now particularly to FIGS. 2 and 8, the soil testing implement 10 is adapted to be supported in a test bore hole 60 by means of a plurality of connectable and disconnectable rod elements 61. Each of the rod elements 61 includes an externally threaded end portion 62 and an internally threaded end portion 63. The externally threaded end portion of one of the rod elements 61 is adapted to be threadably received by an internally threaded collar 64 secured to the upper surface of the soil testing implement 10. The extendable rod means 61 can be fabricated of a selected number of rod elements to permit the test implement 10 to be lowered to a predetermined depth within the test bore hole. The rod elements 61 can be removed or added therefrom until the soil testing implement is supported at the required position. The soil testing implement 10 is maintained at the predetermined location relative to the test bore hold by inserting the rod elements 61 through a collar 65. Collar 65 includes conventional threaded set screw means 66 which will permit the collar to be locked in a selectively set position. Collar 65 is secured to the upper surface of a support plate 67. The support plate 67 is detailed in dimensions to overlie the lateral edges of a test bore hole for supporting the soil testing implement. As shown in FIG. 1, the supporting plate 67 includes a notched portion 68. Notched portion 68 is detailed to permit the control lines 19, 36, and 51 to pass therethrough for attachment to the remote control console 100.

As shown in FIG. 3, an alternate soil implement suspension method is shown. The alternate soil implement suspension includes a plug element 70 which includes an externally threaded end portion 71. Externally threaded end portion 71 is detailed to be threadably received by the soil implement collar 64. A hook member 72 is attached to the plug 70 and is adapted to be connected to a conventional cable suspension means 74. The cable suspension means 74 can be operatively connected to conventional winch means supported above the test bore hole 60 or can be maintained in position relative to the test bore hole by manually holding the flexible cable and adjusting the predetermined length of the cable to move the soil testing implement to the required depth.

Referring now particularly to FIG. 1, the soil testing implement 10 is connected to a remote control console 100 which is positioned in the area of the test bore hole on the surrounding ground surface. The remote control console 100 includes a housing construction in the form of a conventional suitcase which includes a base portion 101 and a hingedly attached top portion 102. The base portion 101 includes a conventional support handle 103 and a pair of releasable locking elements 104, 105. The releasable locking elements 104, 105 are adapted to be operatively connected with the latch elements 105, 106, attached to the housing top 102.

As shown in FIG. 1, the housing bottom 101 includes a cavity portion 107. Cavity portion 107 is detailed in dimension and design for supporting and containing the soil testing implement 10 and the control lines 19, 36 and 51 for storage and transport. Located to the left of cavity portion 107 is a compartment 108. Compartment 108 is detailed for housing a conventional pressurized supply source (not shown) such as a previously pressurized supply tank or hydraulic pump means. Also, provided in the base portion 102 is a battery storage compartment 109. Battery storage compartment 109 is operable for housing conventional means for furnishing a supply of electrical current to the electrical transducer and for controlling conventional electromagnetic valve means (not shown) operatively connected between the pressurized hydraulic supply source and the hydraulic input lines 19, 36. The console 100 includes a control panel 110. Control panel 110 includes a number of selectively operable control elements 111 which are operatively associated with the pressurized supply source and the hydraulic supply lines 19, 36 for controlling the flow of hydraulic fluid into and out of the supply lines. A pressure gauge means 112 is provided on the control panel for measuring the amount of pressure supplied to the hydraulic control lines 19, 36. A conventional electrical volt meter 113 is supported on the control panel 110. Volt meter 113 is electrically connected with the electrical transducer 40 whereby the penetration of the penetration element 30 can be calculated. A selectively adustable control knob 114 is operatively associated with the volt meter 113 and transducer 40 for effecting operation of the transducer.

Figures 10, 13:
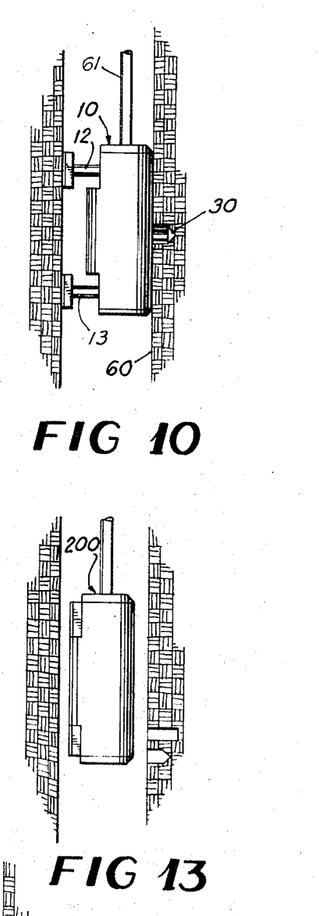

In performing a soil testing operation utilizing the soil testing implement 10 and the remote control console 100, the soil testing implement 10 is lowered into position adjacent a predetermined depth 10 by either attaching a number of selectively extendable rod elements 61 or by attaching the cable suspension means 70. After the soil testing element 10 has been properly positioned at a predetermined depth, a selected one of the control knobs 111 is actuated for furnishing a supply of hydraulic pressure through control line 19, through input port 18 into the cylindrical chambers 17. Hydraulic fluid entering the cylindrical chambers 17 will force the piston element 16 outwardly against compression spring 20, thereby effecting movement of the stabilizers 12, 13 in an extended position, the soil testing implement 10 is locked in position relative to the test bore hole and a predetermined surcharge pressure is applied to the said walls. After the test implement 10 has been properly positioned and locked by the stabilizers 12, 13, a selected one of the control knobs 111 is adjusted to cause hydraulic fluid to flow through control lines 51 into the supply port 35 and into the cylinder chamber 34. Hydraulic fluid flowing into chamber 34 will effect movement of the penetration element 30 outwardly into the soil of test bore hole wall, as shown in FIG. 10.

Immediately prior to effecting penetration of the penetration element 30, the transducer element 40 is conditioned in an on position by adjusting the control knob 114. With the transducer 14 turned on, movement of the hydraulic piston means 33 will effect displacment of cantilever beam 43. Displacement of cantilever beam 43 will vary an electrical current to be conducted to volt meter 113. The amount of voltage applied to volt meter 113 can be correlated with conventional chart means (not shown) to determine the linear penetration of penetration element 30.

After a first measurement has been recorded from the hydraulic pressure gauge means 112 and the volt meter 113, additional hydraulic pressure is supplied to the cylinder 34, thereby effecting additional penetration of the penetration element 31. With the penetration element moved to a second adjusted position, another pressure and voltage reading is recorded. After a predetermined number of penetrations and measurements have been made at one depth in a test bore hole, the stabilizers 12, 13 are retracted and the soil testing implement 10 is raised or lowered to a second predetermined depth wherein operation of the soil stabilizers and soil penetration element is repeated and still additional measurements are recorded. The soil penetration measurements recorded from the pressure gauge associated with the penetrating element and the volt meter associated with the transducer are compared to data provided on form charts whereby the soil characteristics of the area being tested can be determined.

FIRST MODIFICATION OF THE SOIL TESTING IMPLEMENT

Referring now particularly to FIGS. 5 and 7, a modified soil testing implement is shown and generally represented by the reference numeral 200. The soil testing implement 200 includes a cylindrical body member 201 reciprocally operable stabilizer means 203, 204. The soil testing implement 200 also includes a soil penetration element generally represented by the reference numeral 205. The stabilizer means 203, 204 and the soil penetration element 205 is identical in construction to the stabilizer means and soil penetration element described hereinabove in regard to the first soil testing implement and corresponding parts are identified by like reference numerals.

As shown in FIGS. 5 and 7, the modified soil testing implement 200 includes a pair of soil sampler means 211, 212. Each of the soil sampler means includes a cylindrical body 213 having a substantially closed end 214 and an open end 215. The peripheral edge of open end 215 is provided with a bevel or sharpened surface 216 to permit easy penetration of the soil. The cylindrical body 213 is connected to a conventional piston element 217. Piston element 217 is reciprocally supported within a cylinder chamber 218. The extended end of soil sampler body 213 is reciprocally supported by conventional bearing means 219. A compression spring means 220 is provided around the soil sampler body 213 and located between bearing means 219 and piston 217 for spring biasing the piston and soil sampler to a retracted inoperable position.

Movement of the piston and soil sampler to an extended operable soil sampling position is effected by means of hydraulic fluid introduced through supply port 221. Supply port 221 is hydraulically connected by a conventional control line (not shown) to the remote control console 100. As shown in FIGS. 5 and 7, each of the soil sample means 211, 212 may include a transducer means 230, 231. The transducer means 230, 231 are identical in construction to the transducer means 40 operatively associated with the soil penetration element and corresponding reference numerals have been applied to corresponding parts. As shown in FIG. 7, a flexible conduit drainage means 232 is operatively connected between the internal cavity portion of the soil sampler body and an external location of the soil testing implement whereby moisture or water forced into the soil sampler can be transferred therethrough to prevent a pressure build up in the back of the soil sampler that will effect a soil sampling operation. The flexible conduit means 232 is constructed to automatically collapse and extend during reciprocating movement of the soil sampling means.

As shown in FIG. 5, a filter means 234 is supported in the soil sampler chamber 213 in spaced relationship relative to end wall 214. Filter means 234 will prevent soil particle from entering and blocking the flow of water through the conduit 232. A pair of conventional electrical operable switch means 238, 239 are operatively associated with the piston element 217 and electrically connected to conventional light means (not shown) provided on the remote console 100, whereby the fully retracted and fully extended position of the soil sampler can be indicated.

In operation, the soil samplers 211, 212 are hydraulically connected to independent control means, whereby the soil samplers can be individually moved from the retracted inoperable position to the extended operable position. In utilizing the modified soil testing implement shown in FIGS. 5 and 7, the soil testing implement is connected to the remote control console 100 and is lowered into position in a test bore hole in the same manner as described above in regard to soil testing implement 10. The stabilizer means 203, 204 and the penetration element 205 are controlled for soil testing measurements in the same manner as described in regard to soil testing implement 10. However, in addition to taking certain penetration tests utilizing the penetration element 205, a soil sample can be obtained from the area adjacent the soil penetration test.

A soil sample is obtained by actuating a selected one of the control knobs 111 on the remote control console to effect a supply of hydraulic pressure through port 222 to thereby drive piston 217 outwardly to an extended position. Movement of the piston 217 to an extended position will advance the soil sampler body 213 into the soil of the test bore hole. After the soil sampler has been moved to a fully extended position as will be indicated by conventional indicator light means, (not shown) controlled by switch 238, the soil sample is retained for transport to the surface by operating the selected control knob 111, allowing piston 217 and soil sampler 213 to be retracted. During movement of the soil into the soil sampler, any moisture trapped within the soil or between the soil sample and chamber end portion 214 will be forced outwardly through conduit 232 to an opposite remote side of the test implement 200. The soil testing implement 200 can be further utilized by retracting the stabilizers 203, 204, and the soil penetration element 205 and lowering the soil testing implement 200 to still a further depth within the test bore hole.

After a second depth in the test bore hole is reached, the soil testing implement is locked into position by stabilizers 203, 204 which also apply a surcharge pressure to the soil in the test bore hole wall, after which the soil penetration element 205 is operated to obtain a required penetration test. After the additional soil penetration tests are obtained at a second depth within the test bore hole, a second soil sample adjacent the second test can be obtained by effecting operation of soil sampler 212. The soil sampler 212 is operated in the same manner as soil sampler 211 by effecting operation of an additional one of the control knobs 111. After the second soil sample has been obtained, the soil sampler is retracted, the stabilizers 203, 204 and penetration element 205 are retracted and the soil testing implement 200 is removed from the test bore hole for performing tests in additional test bore holes or for placing in the remote control console for transport to still another on-the-site testing operation. Even though the soil testing implement 200 has been shown to include two soil sampler mechanisms, it is obvious that any number of soil sampler mechanisms could be provided within a soil testing implement and could be operatively controlled by independent control mechanisms located at the remote control console 100 and/or by valves (not shown) located within the soil testing implement 200.

SECOND MODIFICATION OF THE SOIL TESTING IMPLEMENT

Figure 14:
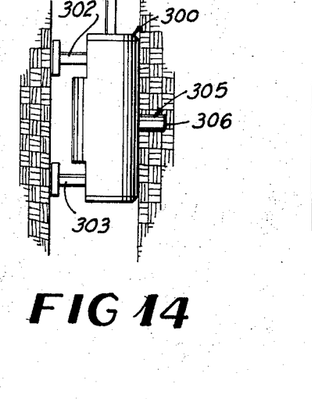
FIGS. 14 and 15 are schematic illustrations of a modified soil testing implement performing an alternate soil testing operation.
Figure 15:
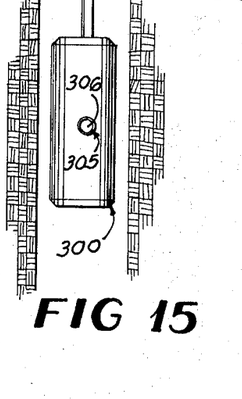

Referring now to FIGS. 14 and 15, a second modification of the soil testing implement is shown and generally represented by the reference numerals 300. The soil testing implement 300 includes a cylindrical body member 301 having a pair of hydraulically operated stabilizer members 302, 303. Stabilizer members 302, 303 are operated in the same manner as described above in regard to soil testing implements 10 and 200 and reference is made to the above description for the details of construction. The soil testing implement shown in FIGS. 14 and 15 also includes a penetration element 305. The penetration element 305 is hydraulically operated in the same manner as penetration elements 30, 205 but differs in that it includes a blunt end 306. The soil penetration element with the blunt end is utilized to perform a CBR test within a test bore hole.

A CBR test utilizing soil testing implement 300 is performed by lowering the testing implement to a predetermined depth in a test bore hole, effecting operation of the stabilizer members 302, 303 to apply a predetermined measurably surcharge pressure on the soil walls adjacent to the area to be penetrated and thereafter effecting control penetration of the blunt end penetration element 305. Increments of penetrations and pressure readings are obtained on the remote console 100 and these measurements are recorded for comparison with previously prepared charts for indicating the CBR rating of the soil.

Even though soil sample means have not been shown and described in regard to the soil testing implement 300, it is obvious that soil samplers similar to the one shown and described in regard to implement 200 could also be provided with implement 300 and would be operated in substantially the same manner.

After a CBR test is performed with the testing implement 300, the stabilizers 302, 303 are retracted and the implement is lowered or raised to still another depth for making additional CBR tests. After the required number of CBR tests are performed within a test bore hole, the testing implement 300 is removed or transported to still another bore hole in the area or to still another construction site.

THIRD MODIFICATION OF THE SOIL PENETRATION ELEMENT

Figure 16:
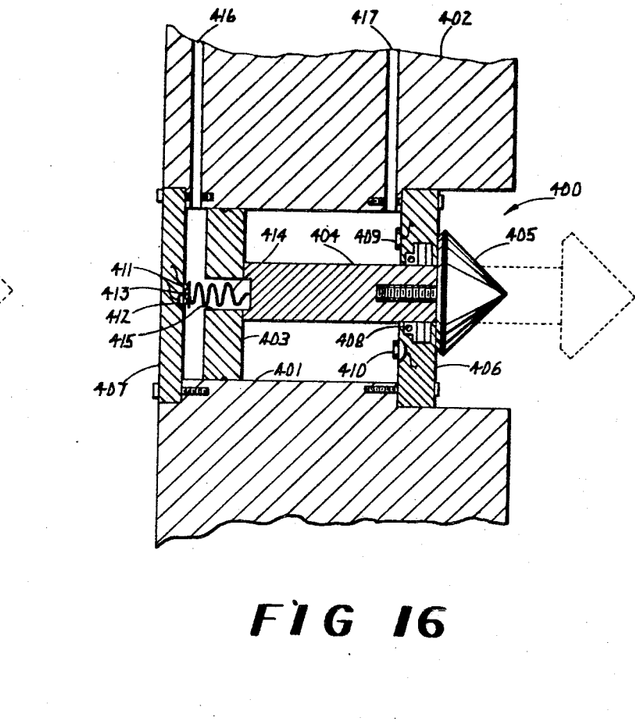
FIG. 16 is an enlarged fragmentary vertical sectional view of a modified soil penetrating element.

Referring now particularly to FIG. 16, a third modification of the soil testing element is shown and generally represented by the reference numeral 400. Soil penetration element 400 includes a cylindrical chamber 401 formed within the test implement housing 402. A conventional piston element 403 is reciprocally supported in the cylinder 401 and includes a rod element 404. A conical-shaped soil penetration point 405 is threadably connected to an extended end of piston rod 404. A support plate member 406 is secured by conventional threaded connecting means to one end of the cylindrical chamber 401 and a second end plate member 407 is secured to an opposite axially spaced end of chamber 401. The piston rod element 404 is supported in end plate member 406 by conventional bushing and sealing means generally represented by the reference numeral 408.

As shown in FIG. 16, a pair of electrical switch elements 409, 410 are mounted on the inside surface of support plate member 406. Switch means 409, 410 are electrically connected to indicator light means (not shown) provided on the remote control console. A pair of switch elements 411, 412 are supported on the inside surface of end plate member 407. Switches 411, 412 are adapted to be electrically connected by means of a switch contact member 413 which is attached to a spring element 414. Spring 414 is mounted within an opening 415 provided in piston means 403. Reciprocating movement of pistons 403 is controlled by input of fluid through input ports 416, 417. When the piston element 403 is moved to a fully retracted position, as shown in FIG. 16, the switch contact 413 will electrically connect switch elements 411, 412 thereby illuminating an indicator light on the remote control console to indicate that the piston element 403 and penetration element 405 is in the fully retracted position. The recessed spring is pre-compressed so that contact with switch elements 411, 412, remains until a predetermined penetration position is achieved. This initial predetermined penetration position is referred to as a "seating penetration." The pressure gauge in the consale is read when this seating position is achieved. The penetration element is then further translated until a fully extended position is achieved.

Normally the most significant data is obtained by measuring the gauge pressure corresponding to the fully extended position and subtracting the seating penetration pressure corresponding to the intermediate position. This method reduces the effect of soil disturbance at the periphery of the bore hole. However, for harder soils, where a fully extended position may not be possible to obtain, intermediate position measurements are adequate to determine the relative consistency of the soil (or rock).

When the piston 403 is moved to a fully extended position, the right axial surface of the piston 403 will contact switch elements 409, 410 to illuminate an additional indicator light means (not shown) on the remote console unit on to indicate that the piston and penetration element is in the fully extended position. When the piston element 403 moves away from switch elements 411, 412 the light associated therewith is turned off and when the piston moves away from switch elements 409, 410, the indicator light associated therewith is also turned off. As can be seen, the use of a combination of electrical switches associated with the piston element 403 can be used to indicate when the piston and penetration element is in the intermediate position and is moved to the fully extended position.

FOURTH MODIFICATION OF THE SOIL PENETRATION ELEMENT

Figure 17:
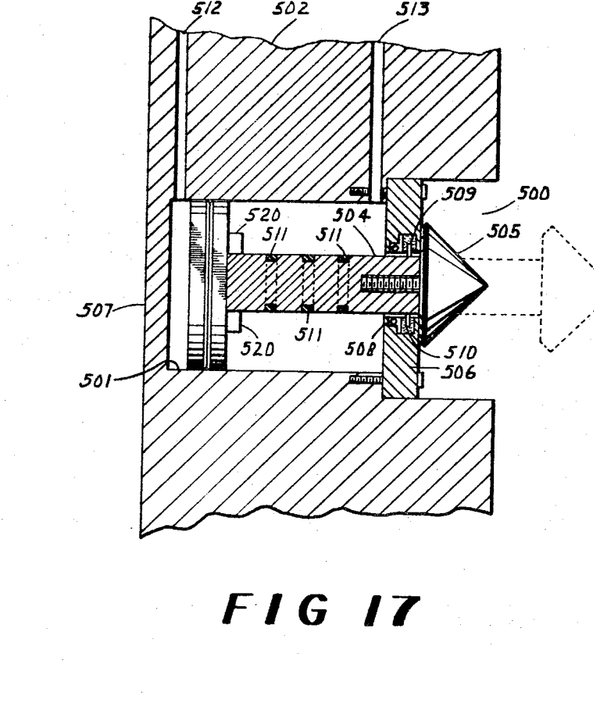
FIG. 17 is an enlarged fragmentary vertical sectional view of still another modification of a soiil penetrating element.

Referring now particularly to FIG. 17, a fourth modification of the soil penetration element is shown and generally represented by the reference numeral 500. The soil penetration element 500 includes a cylindrical chamber 501 provided in the soil testing implement housing 502. A reciprocally operable piston 503 is supported within the cylindrical chamber 501 for cyclic movement therein. A piston rod 504 is connected to the piston element 503 and includes a conical-shaped penetration point 505. The conical-shaped penetration point 505 is attached to the piston rod 504 by conventional threaded connecting means (not shown). An end plate member 506 is secured to the housing 502 adjacent and in axially aligned relationship with chamber 501 for providing an enclosed hydraulic cylinder means. The opposite end of the cylindrical chamber 501 is enclosed by an integrally formed housing portion 507. The piston rod element 504 is slidably supported within end plate 506 by conventional bushing and sealing means generally represented by the reference numeral 508.

As shown in FIG. 17, insulated switch contact means 509, 510 are supported in the end plate member 506 in sliding contact with the piston rod element 504. A plurality of axially spaced non-conducting annular ring members 511 are provided on the piston rod element 504. The annular ring members 511 are detailed in axially spaced location to indicate increments of penetration of the penetration element 505. Reciprocal movement of the piston 503 within chamber 501 is controlled by means of hydraulic fluid supplied through input ports 512, 513. The switch elements 509, 510 are electrically connected to indicator light means (not shown) on the remote console unit and when the switch element 509, 510 are in contact with the piston rod elements, current is allowed to flow therethrough to turn the light to an on position.

When the piston element 503 is expanded causing the piston rod 504 to move axially to effect movement of the penetration element 505 into the bore hole wall, the axially spaced non-conducting annular ring members 511 will move into positions of alignment with the switch means 509, 510. When a non-conducting annular ring 511 contacts the switch elements 509, 510 the light associated therewith will be turned off indicating that the penetration element has reached a first predetermined increment of penetration.

When the hydraulic piston 503 is expanded to additional increments of penetration, the annular ring elements 511 will control the switch means 509, 510 to indicate additional increments of penetration of the penetration element 505. Thus it can be seen that the switch contact members 509, 510 electrically connected to indicator light means and operatively associated with the axially spaced non-conducting ring members 511 can be used to indicate increments of penetration of the penetration element 505 whereby the predetermined measurements can be taken at selected increments of penetration.

As shown in FIG. 17, a small conventional electrically operable vibration unit 520 is operatively associated with the piston 503 and piston rod 504. The vibration unit 520 is operable by conventional control means (not shown) on the remote console for effecting a vibration of the hydraulic cylinder and penetration element 505. The vibration of the penetration element 505 can be used to simulate a vibrating load on the soil to indicate still additional characteristics of the soil due to resistance of penetration. In addition, a dynamic "end pulse" load can be transmitted to the penetration element by means of conventional cyclically operated transmitting equipment located within the remote console or within the soil testing implement. The vibration unit or dynamic load generation means can be employed with either of the above described soil penetration element modifications.

FIFTH MODIFICATION OF THE SOIL TESTING IMPLEMENT

Figure 18:
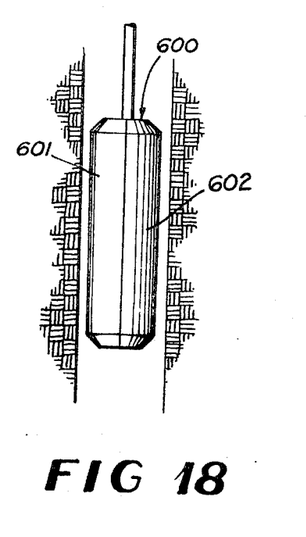
FIG. 18 is a schematic illustration of a modified soil testing implement lowered to a predetermined position in a soil test bore hole.
Figure 19:
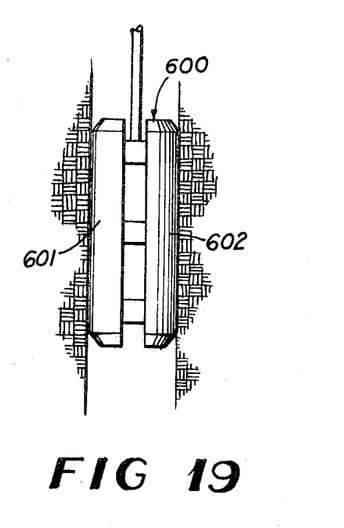
FIG. 19 is a schematic illustration of the modification shown in FIG. 18 with the soil testing implement moved to one adjusted position.
Figure 20:
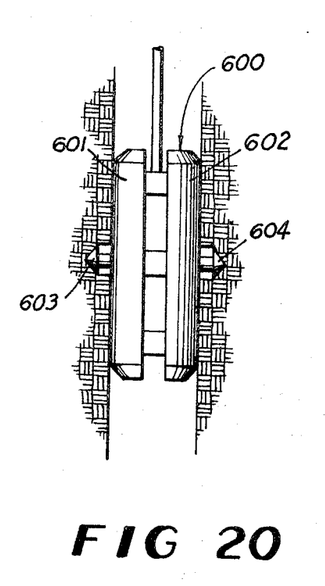
FIG. 20 is a schematic illustration of the soil testing implement shown in FIGS. 18 and 19 moved to still another adjusted soil testing position.

Referring now to FIGS. 18–20, the fifth modification of the soil testing implement is shown and generally represented by the reference numeral 600. The soil testing implement 600 includes an elongated cylindrical shaped body constructed of two movable sections 601, 602. The two movable sections 601, 602 are suspended within a test bore hole in substantially the same manner as described above in regard to the soil testing implement 10 and is provided with similar control lines for effecting the various operations of soil testing implement. The two sections of the cylindrical soil testing implements 601, 602 are adjustable relative to each other by conventional pneumatic or hydraulic cylinder means supported therein (not shown). The hydraulic or pneumatic cylinder expansion means are similar to those described hereinabove for effecting movement of the stabilizer members 14.

As shown in FIG. 20, each of the sections 601, 602 include an opposed adjustable penetration element 603, 604, respectively. The penetration elements 603, 604 are identical in construction to the penetration element 30 described hereinabove and reference is made to the above description for the details of construction.

In operation of the soil testing implement shown in FIGS. 18-20, the soil testing implement is lowered to a predetermined position in a test bore hole, control means on the remote console is operated to effect movement of the section 601, 602 to an expanded condition for applying a surcharge pressure on the walls of a test bore hole and for stabilizing the soil testing implement within the test bore hole. After the sections 601, 602 are moved to an expanded position, the penetration elements 603, 604 are then operated to effect a penetration of the soil of the walls of the test bore hole and measurements of penetration, including measurements or force required to effect increments of penetration is recorded as stated hereinabove.

SIXTH MODIFICATION OF THE SOIL TESTING IMPLEMENT

Figure 21:
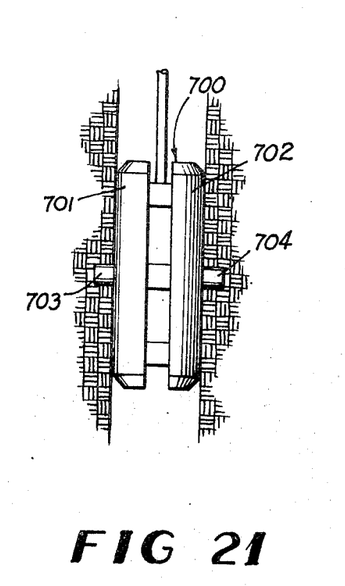
FIG. 21 is a schematic illustration similar to FIG. 20 showing still another modification of a soil testing implement.

Referring now particularly to FIG. 21, a sixth modification of the soil testing implement is shown and generally represented by the reference numeral 700. The soil testing implement 700 is identical in construction to the soil testing implement 600 except that the penetration elements are provided with a blunt end for performing a C.B.R. test as disclosed above in the description of the second modification 300. The soil testing implement 700 includes two sections 701, 702 which are supported for adjustment from a retracted position to an expanded position, as shown in FIG. 21, and includes two opposed C.B.R. penetration elements 703, 704.

The basic feature of the fifth and sixth modifications of the soil testing implement includes the two opposed penetration elements. There are two advantages in the provision of two opposed soil penetration elements. One advantage is that twice the area (volume) of soil is tested, which will tend to decrease errors caused by anomalies such as gravel or air voids. The second advantage is that the actual penetration can be more accurately measured, since exact total translation can be determined and divided by two for arriving at an average separate translation or penetration.

In each of the above described soil penetration elements, different sized conical-shaped penetration elements can be used, with smaller angled conical ends being provided for harder soil and even for rock to determine penetration resistance. The blunt end of the C.B.R. type piston can be used in rock to determine its modulus of elasticity.

Even though each of the above described soil penetration elements and the soil sample means have been shown and described as being operated by hydraulic control means, it is obvious that pneumatic control means can be used to effect the required control movement of the penetration element and the soil sample means. Further, in using the hydraulic cylinder means or the pneumatic control means, the respective cylinders can be constructed to either include one-way power control movement of the cylinder with a spring return or can be constructed to use conventional double-acting cylinders, with power produced from the remote control console for effecting movement of the cylinder in both directions.

In each of the above described modifications, the penetration element can be operated to effect a control rate of penetration with measurements produced on the indicating voltage meter for determining the resistance to penetration at selected penetration intervals.

It now becomes apparent that the above described illustrative embodiments of the soil testing method and apparatus of the present invention are capable of obtaining the above stated objects and advantages. It is obvious that those skilled in the art may make modifications in the details of construction without departing from the spirit of the invention which is to be limited only by the scope of the appended claims.

What is claimed is:

1. Apparatus for use in determining the soil characteristics of an area by conducting a number of on-the-site soil penetration measurement in a test bore hole, said apparatus including:
   a. a soil testing implement, said soil testing implement includes a penetration element operable for effecting penetration in the soil of a test bore hole;
   b. means for lowering said soil testing implement to a predetermined depth within a test bore hole;
   c. control means operatively associated with said penetration element for effecting penetration of the soil in a test bore hole at said predetermined depth;
   d. means for producing predetermined measurements of force required to effect increments of penetration of said penetration element;
   e. means for producing predetermined measurements of the increments of penetration; and
   f. said soil testing implement including means for stabilizing said penetration means for locking said penetration means into position at a predetermined depth in a test bore hole and for applying a surcharge pressure to the soil in said test bore hole in the area of said penetration.

2. Apparatus for use in determining the soil characteristics of an area by conducting a number of on-the-site soil penetration measurement in a test bore hole, said apparatus including:
   a. a soil testing implement, said soil testing implement includes a penetration element operable for effecting penetration in the soil of a test bore hole;

b. means for lowering said soil testing implement to a predetermined depth within a test bore hole;
c. control means operatively associated with said penetration element for effecting penetration of the soil in a test bore hole at said predetermined depth;
d. means for producing predetermined measurements of force required to effect increments of penetration of said penetration element;
e. means for producing predetermined measurements of the increments of penetration; and
f. said soil testing implement including soil sampling means, said soil sampling means including power operable control means operable for effecting operation of said soil sampling means to obtain a soil sample in the area of a test bore hole.

3. Apparatus for use in determining the soil characteristics of an area by conducting a number of on-the-site soil penetration measurement in a test bore hole, said apparatus including:
a. a soil testing implement, said soil testing implement includes a penetration element operable for effecting penetration in the soil of a test bore hole;
b. means for lowering said soil testing implement to a predetermined depth within a test bore hole;
c. control means operatively associated with said penetration element for effecting penetration of the soil in a test bore hole at said predetermined depth;
d. means for producing predetermined measurements of the force required to effect increments of penetration of said penetration element;
e. means for producing predetermined measurements of the increments of penetration; and
f. said control means including a portable lightweight control console having self-contained power means for effecting operation of said penetration element and for effecting operation of said measurement producing means.

4. Apparatus as in claim 3 wherein a power operated piston is provided for actuating said penetration element.

5. Apparatus as in claim 4 wherein said console includes a signal light and means are provided which are actuated by said piston for closing a circuit through said light where said piston is in a predetermined position.

6. Apparatus as in claim 4 wherein said piston is actuated in each direction of its movement.

7. A method of conducting on-the-site soil penetration measurements in a preformed test bore hole, said method including the steps of:
a. lowering soil penetration means to a predetermined depth in a preformed test bore hole;
b. applying pressure to an area of the soil walls in the test bore hole adjacent said predetermined depth;
c. effecting a penetration laterally into the walls of the soil of said preformed test bore hole at said predetermined depth;
d. measuring the distance of said penetration; and
e. measuring the force required to effect said penetration.

* * * * *